United States Patent Office 3,062,838
Patented Nov. 6, 1962

3,062,838
STABILIZATION OF 3,4-DIHYDRO-1,2-PYRAN-2-CARBOXALDEHYDE
George F. Johnson, Baytown, and Lawrence C. Teague, Houston, Tex., assignors to Shell Oil Company, New York, N.Y., a corporation of Delaware
No Drawing. Filed Oct. 11, 1960, Ser. No. 61,851
11 Claims. (Cl. 260—345.9)

This invention relates to the inhibition of undesirable reactions, especially polymerization, of 3,4-dihydro-1,2-pyran-2-carboxaldehyde, commonly known as acrolein dimer because it is produced commercially by thermal dimerization of acrolein.

Acrolein dimer is a reactive intermediate useful in the preparation of a variety of compounds having valuable properties. It has the drawback of being quite unstable with respect to polymerization and upon storage under ordinary conditions will eventually solidify. While the bulk of the polymer so formed is revertible to the desirable dimer by distillation, not only does the polymerization introduce difficulties in handling and processing but also there is always a loss of a significant portion of the acrolein dimer as a result of formation of polymer which is not revertible to the starting dimer. Indeed, any heating of the dimer accelerates its polymerization and formation of polymer which does not revert readily to the desired product. The formation of irrevertible polymers is also promoted by even small amounts of water or alcohols as well as by metals commonly used in the construction of equipment for production and use of acrolein dimer. As a result formation of irrevertible polymer can be a source of serious loss during initial production of the dimer by heating acrolein and during its recovery by distillation.

A number of stabilizers are known which are effective in varying degrees for suppressing the formation of revertible polymer encountered in storage of purified acrolein dimer at normal temperatures. As shown in Fountain-Sharp patent, U.S. 2,537,579 small amounts of acidic materials can be used in this way. Tannic acid is an excellent stabilizer as claimed in Whetstone patent, U.S. 2,514,688. Iron oxide can also be used according to Guest-Kiff, U.S. 2,800,488.

Applicants have found, however, a new class of acrolein dimer stabilization agents which are not only effective in suppressing the formation of revertible polymer during storage but also are capable of substantially reducing the formation of irrevertible polymer during exposure of the acrolein dimer to heat whether in the process of its manufacture or in distillation or use, whether or not water, alcohols or metal polymerization catalysts are present. These new stabilizers are a special type of carboxyl-substituted amines, namely those having at least one trivalent nitrogen atom to which are directly attached at least two carboxyl groups which are linked to the nitrogen atom by a saturated aliphatic hydrocarbon group in which not more than two carbon atoms separate the carboxyl carbon atom from the nitrogen atom. The unique structural arrangement of these substituted amines makes them especially effective in retarding that type of polymerization which leads to polymers not revertible to acrolein dimer on distillation. The substituted amines of this kind which have been found to give the best stabilization under all conditions are those which contain at least two polycarboxyalkylamino groups in which the carboxyl groups are in free acid form. For example, amines having a —N(R·COOH)$_2$ group where the R's are the same or different alkylene radicals linking their carboxyl groups to the nitrogen by a chain of not more than two carbon atoms are useful.

United States Patent 2,371,623 describes a number of polycarboxy amines of this kind such as nitrilotriacetic acid, aminoethyl-N,N-diacetic acid, ethylene diamine-N,N,N',N'-tetraacetic acid, etc., which can be successfully used to control the polymerization of acrolein dimer according to the invention. Especially advantageous are those polycarboxy amines which contain a plurality of N,N-dicarboxyalkylamino groups in the molecule, especially those having at least two adjacent carbon atoms to each of which is directly attached at least one of said N,N-dicarboxyalkylamino groups. Those containing 6 to 24 carbon atoms per molecule are particularly suitable. A sub-group of polycarboxyamines of this preferred type is the water-soluble N,N-(dicarboxyalkyl)amino-substituted carbocyclic compounds having a saturated carbocyclic ring with at least two adjacent ring carbon atoms each directly linked to the nitrogen atom of an N,N-di(carboxyalkyl)amino group containing up to two carbon atoms in each of said alkyl radicals. Examples of stabilizers of this type which are useful are the 1,2-diaminocycloalkane-N,N,N',N'-tetraacetic acids having 5 to 18 carbon atoms in the cycloalkane radical, such as 1,2-diaminocyclopentane-N,N,N',N'-tetraacetic acid, disodium 1,2-diaminocyclohexane-N,N,N',N'-tetraacetic acid, 1,2-diaminoperhydronaphthalene - N,N,N',N' - tetraacetic acid, 4,7-diisobutyl-1,2-diaminoperhydronaphthalene - N,N,N',N'-tetraacetic acid and the like.

Another useful type of polycarboxyamines which can be used in the invention are the water-soluble alkylene polyamino polycarboxylic acids having up to three carbon atoms in the carboxylic acid groups such as ethylene diamine-N,N,N',N'-tetraacetic acid which is sold by Geigy Chemical Corp. under the trade name "Sequestrene" and by Dow Chemical Company as "Versene"; 1,2-diaminopropane-N,N,N',N'-tetraacetic acid; 1,2-diaminopropane-N,N,N',N'-tetrapropionic acid; 1,2-diaminobutane-N,N,N',N'-tetraacetic acid; 2,3 - diaminobutane - N,N,N',N'-tetraacetic acid; and the like. Representative examples of aromatic polyamino polycarboxylic acids which can also be used are 1,2-diaminobenzene-N,N,N',N'-tetraacetic acid; 3,4-diaminodiphenyl-N,N,N',N'-tetraacetic acid; 1,2-diaminoanthracene-N,N,N',N'-tetraacetic acid; 1,2,3-triaminobenzene-N,N,N',N',N'',N''-hexaacetic acid; and the like. All of these compounds can be produced by reacting the corresponding amines with halocarboxylic acids using the method of U.S. Patent 2,130,505, for example, Belgian Patent 567,330 describes still another group of polyamine polyacetic acids which are useful stabilizers for acrolein dimer.

The new stabilizers of the invention are effective in relatively small amounts. Proportions of the order of about 0.001 to about 1% based on the weight of the acrolein dimer will usually be satisfactory although larger amounts can be used if desired. As a general rule, amounts in the range of about 0.01 to 0.10% are preferred for reasons of economy combined with effectiveness.

The acid-substituted amine stabilizers can be incorporated into the acrolein dimer which is to be stabilized using any suitable method. One can dissolve the amine stabilizer in the acrolein dimer in the liquid state or a mutual solvent can be used to bring the dimer and stabilizer into intimate contact when stabilizing preformed acrolein dimer. Ethyl ether, benzene, heptane, carbon tetrachloride and like non-reactive solvents are examples of solvents useful for this purpose. The amine stabilizer can be added to the reaction mixture for the stabilization of acrolein dimer during its manufacture by heating acrolein.

The following examples illustrate in more detail suitable methods of practicing the invention.

EXAMPLE I

This example illustrates the effectiveness of different kinds of diamino tetraacetic acids as stabilizers for acrolein dimer when heated at the temperatures often encountered in its distillation. The tests were made with distilled acrolein dimer containing 0.5% wt. hydroquinone and having a peroxide content of about 9 milliquivalents per liter. The effect of stainless steel was determined by adding about 0.082 gram of fine turnings to the dimer. In each case 10 grams of the acrolein dimer were heated in the presence of air at 150° C. for a period of 16 hours and the formation of irrevertible polymer was measured. The results obtained with and without the diamino-tetraacetic acid stabilizers and other additives are shown in the following table.

| Stabilizer | Amount of Stabilizer, p.p.m. | Polymerization Rate, percent of acrolein dimer polymerized per hr. |
|---|---|---|
| None | None | 4.2 |
| 1,2-diaminocyclohexane-N,N,N',N'-tetraacetic acid | 100 | 1.0 |
| 1,2-diaminoethane-N,N,N',N'-tetraacetic acid | 97 | 1.3 |

The improvement obtained with these stabilizers is in marked contrast to the results obtained when acetic acid, for instance, is added to the acrolein dimer, the polymerization being then accelerated even in the absence of steel to 6.6% per hour instead of being reduced.

EXAMPLE II

The need for using the amino polycarboxylic acid stabilizers in the free carboxylic acid form is shown by the following results, which also show the effectiveness of the stabilizers in the presence of mild steel in spite of its powerful catalytic action in promoting formation of irrevertible acrolein dimer polymer. The tests were made with acrolein dimer containing 0.5% wt. hydroquinone and 2 milliequivalents of peroxide per liter using the procedure of Example I with about 0.1 gram of steel turnings added in each case.

| Additive | Amount of Additive | Percent Acrolein Dimer Polymerized per Hour |
|---|---|---|
| None | None | 15.23 |
| Disodium salt of 1,2-diaminocyclohexane-N,N,N',N'-tetraacetic acid | 100 p.p.m. | 29.34 |
| Disodium salt of 1,2-diaminocyclohexane-N,N,N',N'-tetraacetic acid and ferric acid | 100 p.p.m. / 1 mg. | 28.58 |
| 1,2-diaminocyclohexane-N,N,N',N'-tetraacetic acid in free acid form and ferric oxide | 100 p.p.m. / 1 mg. | 1.12 |

Other amino polycarboxylic acids which are similarly effective acrolein dimer stabilizers under the same conditions are ethylenediamine-N(beta-hydroxyethyl)-N,N',N'-triacetic acid and diethylenetriamine pentaacetic acid.

EXAMPLE III

The usefulness of the new stabilizers in preventing the formation of irrevertible polymer, i.e., polymer not converted to acrolein dimer by distillation at 100° C. under a final pressure of 50 mm. mercury, during storage in metal containers which are catalysts for irrevertible polymer formation is shown by the following results obtained in tests carried out using 0.01% wt. of 1,2-diaminocyclohexanetetraacetic acid as the stabilizer. The acrolein dimer was stored for 63 days at 50° C. in half-filled Pyrex tubes sealed under different gases and containing metal strips as indicated under the heading "Container Material" in the following table:

*Weight Percent of Irrevertible Polymer Formed*

| Atmosphere | Air | | Carbon Dioxide | | Nitrogen [1] | |
|---|---|---|---|---|---|---|
| Container Material | Without Stabilizer, percent | With Stabilizer, percent | Without Stabilizer, percent | With Stabilizer, percent | Without Stabilizer, percent | With Stabilizer, percent |
| Mild steel | 7.2 | 1.4 | 5.1 | 1.2 | 5.8 | 1.7 |
| Aluminum | 9.2 | 1.8 | 8.1 | 1.8 | | |

[1] 66 days' storage instead of 63.

In another test of this same stabilizer in storage of acrolein dimer in Pyrex tubes in the air for 83 days at 20° to 25° C. the irrevertible polymer formation was only 0.5% by weight. Good stabilization can likewise be obtained with the same amount of ethylenediamine-N,N'-di(orthohydroxyphenyl) acetic acid-N,N'-acetic acid as the stabilizer.

EXAMPLE IV

The following results show the usefulness of the amino polycarboxylic acid stabilizers in reducting irrevertible polymer formation during manufacture of acrolein dimer by heating acrolein. Even when the reaction is carried out in the presence of water and/or alcohols such as methanol, isopropanol and normal propanol, these stabilizers are very effective in contrast to other types of compounds which have been proposed for stabilizing acrolein dimer.

The tests were carried out by adding 1,2-diaminocyclohexane-N,N,N',N'-tetraacetic acid to the acrolein feed which was heated to 190° C. for about 70 minutes in a bomb-type reactor constructed of stainless steel. During batch runs the following results were obtained:

| Impurities in the Feed, percent w. | | | Amount of Stabilizer Added to Feed, p.p.m. | Amount of Irrevertible Polymer in Product | Yield of Acrolein Dimer |
|---|---|---|---|---|---|
| Water | Methanol | Isopropanol | | | |
| 0.3 | 1.4 | 1.7 | None | 15.3 | 68 |
| 0.3 | 1.4 | 1.7 | 100 | 8.9 | 76 |

When nitrilotriacetic acid or ethylenediamine-N,N,N',N'-tetraacetic acid are used as the stabilizer in the same way equally good results are obtained.

We claim as our invention:

1. 3,4-dihydro-1,2-pyran-2-carboxaldehyde containing a stabilizing amount of polycarboxyalkyl polyamine having no more than 24 carbon atoms, no more than six carboxyl groups and at least two amine nitrogen atoms linked to adjacent carbon atoms of a hydrocarbon radical, the carboxy groups being linked to saturated aliphatic hydrocarbon groups in which not more than two carbon atoms separate the carboxyl carbon atom from the nitrogen atom.

2. 3,4-dihydro-1,2-pyran-2-carboxaldehyde in accordance with claim 1 containing about 0.001 to about 1% by weight of polycarboxyalkyl alkylene diamine.

3. 3,4-dihydro-1,2-pyran-2-carboxaldehyde stabilized with about 0.001 to about 1% by weight of alkylenediamine-N,N,N',N'-tetraacetic acid having 9 to 10 carbon atoms per molecule and in which the alkylene moiety contains 1 to 2 carbon atoms.

4. 3,4-dihydro-1,2-pyran-2-carboxaldehyde stabilized with about 0.001 to about 1% by weight of ethylenediamine-N,N,N',N'-tetraacetic acid.

5. 3,4-dihydro-1,2-pyran-2-carboxaldehyde stabilized with about 0.001 to about 1% by weight of 1,2-diaminocycloalkane-N,N,N',N'-tetracarboxylic acids having no more than 24 carbon atoms in the molecule with 5 to 18 carbon atoms in the cycloalkane radical and not more than two carbon atoms separating the carboxyl carbon atoms from the nitrogen atom to which they are linked.

6. 3,4 - dihydro - 1,2-pyran-2-carboxaldehyde stabilized in accordance with claim 8 wherein the stabilizer is 1,2-diaminocyclohexane-N,N,N',N'-tetracarboxylic acid.

7. 3,4 - dihydro - 1,2-pyran-2-carboxaldehyde stabilized in accordance with claim 8 wherein the stabilizer is 1,2-diaminocycloalkane-N,N,N',N'-tetraacetic acid.

8. 3,4 - dihydro - 1,2-pyran-2-carboxaldehyde stabilized with about 0.001 to about 1% by weight of 1,2-diaminocyclohexane-N,N,N',N'-tetraacetic acid.

9. In the production of 3,4-dihydro-1,2-pyran-2-carboxaldehyde by thermal dimerization of acrolein, the method of suppressing formation of higher boiling products which are not revertible to 3,4-dihydro-1,2-pyran-2-carboxaldehyde on distillation, which comprises carrying out the heating of the acrolein in the presence of at least 0.001%, based on weight of acrolein fed, of polycarboxyalkyl polyamine of no more than 24 carbon atoms, no more than six carboxyl groups, and containing at least two —N(R—COOH)$_2$ groups wherein the R's are alkylene radicals linking the carboxyl groups to the nitrogen by a chain of not more than two carbon atoms.

10. The method of stabilizing 3,4-dihydro-1,2-pyran-2-carboxaldehyde against formation of higher boiling compounds during heating at temperatures of about 100° to about 200° C. which comprises carrying out said heating in the presence of an N,N,N',N'-dicarboxyalkyl diaminohydrocarbon compound of no more than 24 carbon atoms in which the amino groups are attached to adjacent carbon atoms and not more than two carbon atoms separate the carboxyl carbon atoms from the nitrogen atom to which they are attached.

11. The method of suppressing formation of acrolein dimer polymers which are not revertible to dimer on distillation, which comprises incorporating in the acrolein dimer about .001 to about 1% by weight of polycarboxy-substituted amine having no more than 24 carbon atoms, no more than six carboxyl groups, and at least two amine nitrogen atoms linked to adjacent carbon atoms of a hydrocarbon radical, the carboxy groups being directly linked to said amine nitrogen atoms by saturated aliphatic hydrocarbon groups in which not more than two carbon atoms separate the carboxyl carbon atom from the nitrogen atom.

References Cited in the file of this patent

UNITED STATES PATENTS

| | | |
|---|---|---|
| 2,537,579 | Fountain et al. | Jan. 9, 1951 |
| 2,736,751 | Bernsohn et al. | Feb. 28, 1956 |
| 2,800,488 | Guest et al. | July 23, 1957 |

OTHER REFERENCES

Fryklof: Chemical Abstracts, volume 49, pages 13, 601 (1955).